United States Patent
Inoue et al.

(10) Patent No.: US 7,904,618 B2
(45) Date of Patent: Mar. 8, 2011

(54) BUFFER MANAGING METHOD AND BUFFER MANAGING APPARATUS

(75) Inventors: Keisuke Inoue, Kanagawa (JP); Yasukichi Ohkawa, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 3 days.

(21) Appl. No.: 11/996,359

(22) PCT Filed: May 31, 2006

(86) PCT No.: PCT/JP2006/310908
§ 371 (c)(1),
(2), (4) Date: Feb. 13, 2008

(87) PCT Pub. No.: WO2007/020740
PCT Pub. Date: Feb. 22, 2007

(65) Prior Publication Data
US 2009/0043927 A1 Feb. 12, 2009

(30) Foreign Application Priority Data
Aug. 15, 2005 (JP) ................ 2005-235580

(51) Int. Cl.
*G06F 3/00* (2006.01)
(52) U.S. Cl. ............... 710/54; 710/52; 707/752
(58) Field of Classification Search ............ 710/54, 710/52, 56; 707/752
See application file for complete search history.

(56) References Cited

U.S. PATENT DOCUMENTS

| 5,539,897 | A  | * | 7/1996  | Samanta et al. ........... 711/165 |
| 5,867,734 | A  |   | 2/1999  | Drews |
| 6,173,307 | B1 |   | 1/2001  | Drews |
| 6,304,924 | B1 |   | 10/2001 | Varma |
| 6,832,267 | B2 | * | 12/2004 | Igarashi ................. 710/3 |
| 6,874,062 | B1 | * | 3/2005  | Goldberg ............... 711/117 |
| 6,925,506 | B1 | * | 8/2005  | Raza et al. .............. 710/52 |
| 7,590,764 | B2 | * | 9/2009  | Rooney ................. 710/5 |
| 7,689,623 | B1 | * | 3/2010  | Liu .................... 707/752 |

(Continued)

FOREIGN PATENT DOCUMENTS

JP 08-087478 A 4/1996

(Continued)

OTHER PUBLICATIONS

International Search Report for International application PCT/JP2006/310908.

(Continued)

*Primary Examiner* — Alford W Kindred
*Assistant Examiner* — Ernest Unelus
(74) *Attorney, Agent, or Firm* — Matthew B. Dernier, Esq.; Gibson & Dernier LLP

(57) ABSTRACT

A buffer is provided with a leading pointer and a following pointer. A bitmap in which two bits are assigned to each block is updated to retain which states blocks are in, busy, write-completed, or read-completed. Under the constraint that the two pointers move in the same direction and do not pass each other: after the block designated by the leading pointer starts to be written, the leading pointer is moved to a next block only if the next block is in the read-completed state; and after the block designated by the following pointer starts to be read, the following pointer is moved to a next block only if the next block is in the write-completed state.

16 Claims, 8 Drawing Sheets

| STATE / BITMAP | INITIAL | WRITING | WRITE-COMPLETED | READING | READ-COMPLETED |
|---|---|---|---|---|---|
| 30a | 1 | 0 | 0 | 0 | 1 |
| 30b | 0 | 0 | 1 | 0 | 0 |

U.S. PATENT DOCUMENTS

| | | | |
|---|---|---|---|
| 2001/0054121 A1* | 12/2001 | Proch et al. | 710/57 |
| 2002/0080787 A1* | 6/2002 | Kim et al. | 370/390 |
| 2003/0046498 A1 | 3/2003 | Roever | |
| 2004/0120006 A1* | 6/2004 | Kumar et al. | 358/1.16 |
| 2005/0102336 A1* | 5/2005 | Castejon-Amenedo et al. | 708/250 |

FOREIGN PATENT DOCUMENTS

| | | |
|---|---|---|
| JP | 08241186 A | 9/1996 |
| JP | 2006-040285 A | 2/2006 |
| WO | 03019350 A1 | 3/2003 |

OTHER PUBLICATIONS

International Preliminary Report on Patentability for International application PCT/JP2006/310908.

Office Action for Patent Application JP 2005-235580.

European Search Report for corresponding European application EP 06756828.7, Sep. 8, 2009.

* cited by examiner

FIG. 5
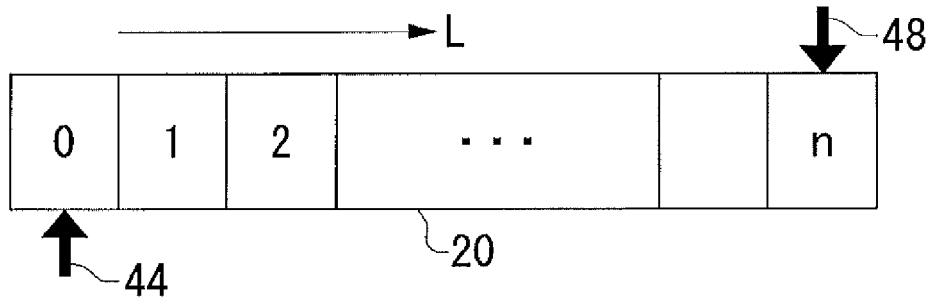
FIG. 6
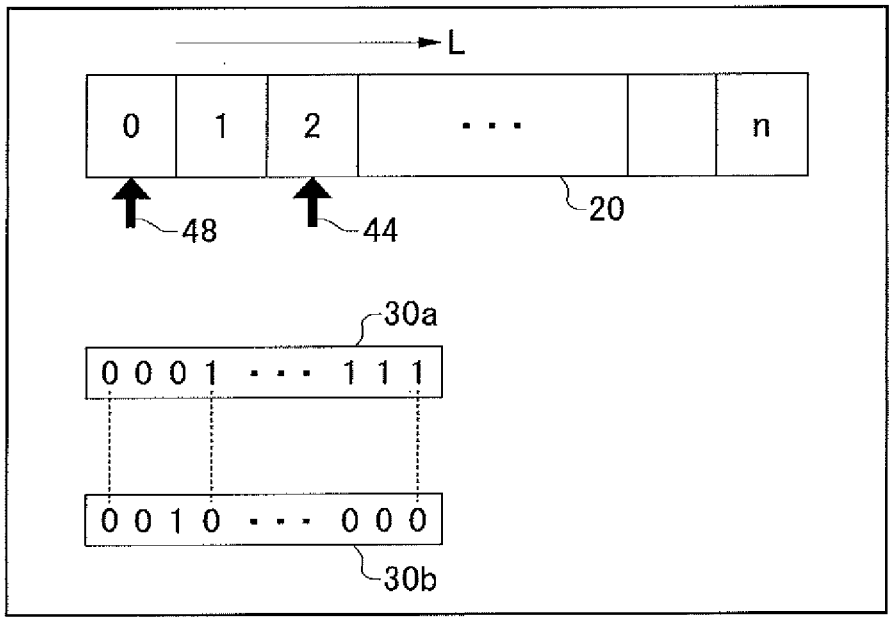
FIG. 7
| STATE<br>BITMAP | INITIAL | WRITING | WRITE-<br>COMPLETED | READING | READ-<br>COMPLETED |
|---|---|---|---|---|---|
| 30a | 1 | 0 | 0 | 0 | 1 |
| 30b | 0 | 0 | 1 | 0 | 0 |

BUFFER MANAGING METHOD AND BUFFER MANAGING APPARATUS

BACKGROUND

The present invention relates to a method for managing a buffer which is intended to exchange data between processing entities in a system that may have a plurality of processing entities, and a buffer management apparatus.

A multiprocessor system, or a system that includes a plurality of processors, can perform processing in parallel or in a cooperative fashion to achieve speedup of the entire processing. Parallel cooperative processing entails data exchange between processors. Processors called producers generate data, which are passed to processors called consumers and are processed by the consumers. The efficiency of the entire system varies depending on how the data exchange between the producers and the consumers is devised.

Aside from multiprocessor systems, data exchange also occurs between tasks in a multitask environment (including multiprocesses and multithreads). In the following description of this specification, processors, tasks, and the like that exchange data with each other will be referred to as processing entities. In the case of multitasking, tasks serve as either of producers and consumers. As with the data exchange between processors, the efficiency of the entire system varies depending on how the data exchange between tasks is devised.

SUMMARY OF THE INVENTION

The present invention has been achieved in view of the foregoing circumstances. It is thus a general purpose of the present invention to provide a buffer management technology capable of managing a buffer intended to exchange data between processing entities, thereby improving the processing efficiency.

A first embodiment according to the present invention is a method for managing a buffer which is divided into a plurality of blocks, the blocks being used cyclically in a predetermined order by a producer and a consumer as a temporary storage location for data to be transferred between processing entities. The producer is a processing entity for writing data. The consumer is a processing entity for reading data written by the producer. This method includes: providing the first block to be written with a leading pointer and a following pointer which designate the block; and retaining block state information indicating which states respective associated blocks are in, busy, write-completed, or read-completed. Then, after the first block to be written starts to be written, the positions of the pointers and the block state information are updated in accordance with the progress of writing and reading.

The pointers are moved under the constraint that the two pointers move in the same direction and do not pass each other. After the block designated by the leading pointer starts to be written, the leading pointer is moved to a next block only if the next block is in the read-completed state. After the block designated by the following pointer starts to be read, the following pointer is moved to a next block only if the next block is in the write-completed state.

In the present invention, a "processing entity" refers to an entity that processes data, either being capable of reading data from a temporary storage location and processing the same or capable of writing processed data to a temporary storage location. This processing entity is not limited to an individual processor in a multiprocessor system, but may cover a task, a process, a thread, and the like.

A second embodiment according to the present invention is also a method for managing a buffer which is divided into a plurality of blocks, the blocks being used cyclically in predetermined order by a producer and a consumer as a temporary storage location for data to be transferred between processing entities. The producer is a processing entity for writing data. The consumer is a processing entity for reading data written by the producer.

This method includes updating and retaining block state information including write completed-or-not information and read completed-or-not information. The write completed-or-not information indicates whether associated blocks are write-completed or not. The read completed-or-not information indicates whether associated blocks are read-completed or not.

Then, the first block to be written is provided with a first leading pointer, a second leading pointer, a first following pointer, and a second following pointer which designate the block. Under the constraint that all the pointers move in the same direction, and the first leading pointer, the second leading pointer, the first following pointer, and the second following pointer do not pass each other in this order: after a block starts to be written, the first leading pointer designating the block is moved to the next block. After the block designated by the second leading pointer finishes being written, the second leading pointer is moved to a block next to a block that is farthest from the second leading pointer among consecutive write-completed blocks subsequent to the block designated by the second leading pointer. Moreover, after a block starts to be read, the first following pointer designating the block is moved to a next block. After the block designated by the second following pointer finishes being read, the second following pointer is then moved to a block next to a block that is farthest from the second following pointer among consecutive write-completed blocks subsequent to the block designated by the second following pointer.

Arbitrary combinations of the aforementioned components, and implementations of the present invention in the form of systems, programs, and program-containing recording media may also be practiced as applicable embodiments of the present invention.

The present invention is advantageous when exchanging data between processing entities in a multiprocessor, multitask, or other system that may have a plurality of processing entities.

BRIEF DESCRIPTION OF THE DRAWINGS

FIG. 5 is a diagram for explaining the movement of pointers;

FIG. 6 is a diagram for explaining the movement of the pointers and the updating of bitmap information;

FIG. 7 is a diagram showing the relationship between the bit values of each bit of the bitmap and block states;

DESCRIPTION OF REFERENCE NUMERALS

Figure 1:
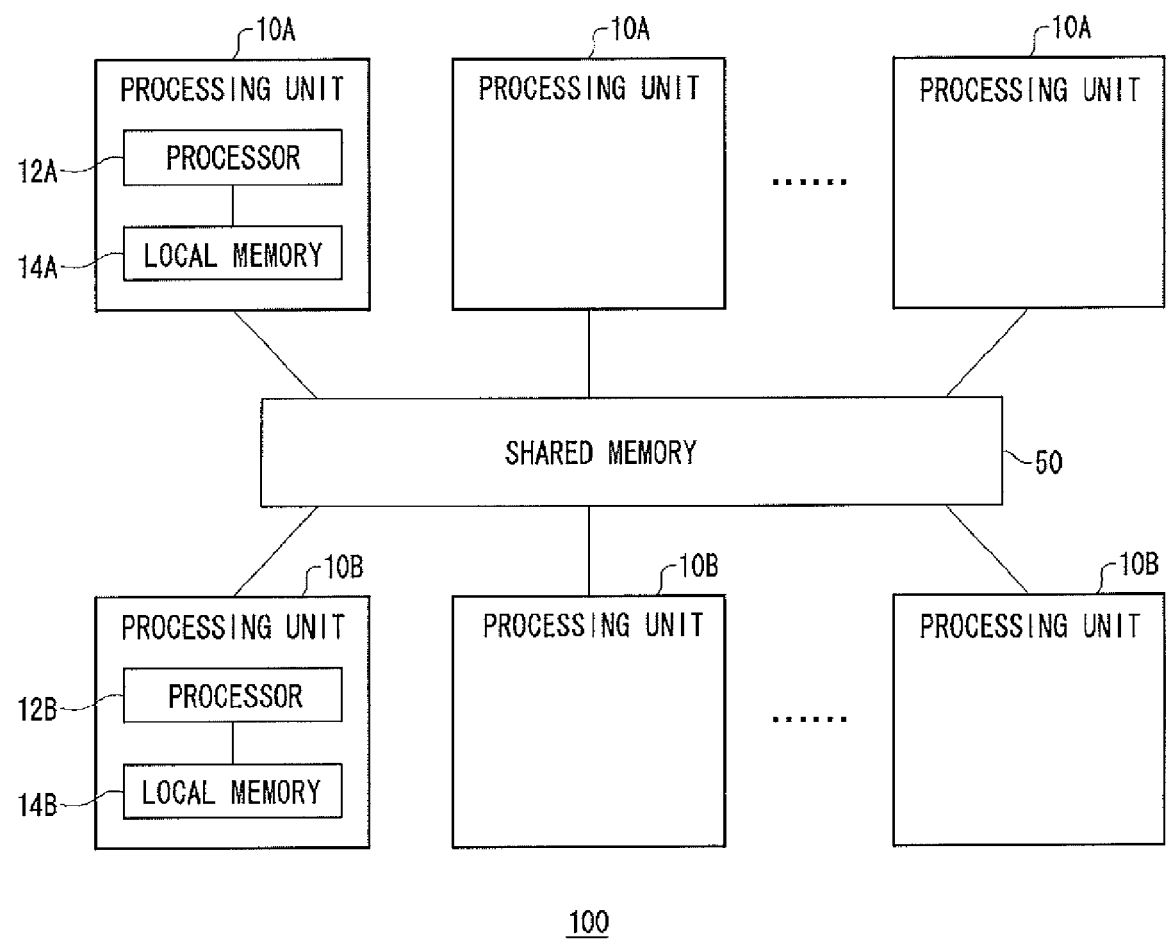
FIG. 1 is a diagram showing a multiprocessor system which is a first embodiment according to the present invention.

10A . . . processing unit, 10B . . . processing unit, 12A . . . producer, 12B . . . consumer, 14A . . . local memory, 14B . . . local memory, 20 . . . buffer, 30 . . . bitmap, 44 . . . leading pointer, 48 . . . following pointer, 50 . . . shared memory, 100 . . . multiprocessor system, 110 . . . processing unit, 112 . . . processor, 114 . . . local memory, 120 . . . buffer, 130a . . . bit string, 130b . . . bit string, 144 . . . first leading pointer, 145 . . . second leading pointer, 148 . . . first following pointer, 149 . . . second following pointer, 150 . . . shared memory, 200 . . . multiprocessor system, 210 . . . processing unit, 212 . . . processor, 214 . . . local memory, 220 . . . buffer, 230 . . . bit string, 240 . . . pointer queue, and 250 . . . shared memory.

DETAILED DESCRIPTION OF THE INVENTION

The embodiments will be overviewed initially. A detailed description will then be given with reference to the drawings.

A first embodiment according to the present invention is a method for managing a buffer which is divided into a plurality of blocks, the blocks being used cyclically in a predetermined order by a producer and a consumer as a temporary storage location for data to be transferred between processing entities. The producer is a processing entity for writing data. The consumer is a processing entity for reading data written by the producer. This method includes: providing the first block to be written with a leading pointer and a following pointer which designate the block; and retaining block state information indicating which states respective associated blocks are in, busy, write-completed, or read-completed. Then, after the first block to be written starts to be written, the positions of the pointers and the block state information are updated in accordance with the progress of writing and reading.

The pointers are moved under the constraint that the two pointers move in the same direction and do not pass each other. After the block designated by the leading pointer starts to be written, the leading pointer is moved to a next block only if the next block is in the read-completed state. After the block designated by the following pointer starts to be read, the following pointer is moved to a next block only if the next block is in the write-completed state.

In the present invention, a "processing entity" refers to an entity that processes data and is capable of reading data from a temporary storage location and processing the same or capable of writing processed data to a temporary storage location. This processing entity is not limited to an individual processor in a multiprocessor system, but may cover a task, a process, a thread, and the like.

In the following description, this method will be referred to as a first method.

In a system that may have a plurality of processing entities, a buffer can be used when exchanging data between the processing entities. The use of the buffer allows a producer to write processing-completed data into the buffer, and a consumer to read data from the buffer for processing. This makes it possible to improve the processing efficiency of the entire system.

With buffer management of this type, the buffer may be locked for data protection while one of the processing entities uses it, so that data in the buffer will not be modified by the other processing entities. Locking the buffer, however, precludes consumers from reading data that has finished being written by producers, if any, until the lock is released. The same applies to producers. When the buffer is locked, producers must wait for unlocking even if the buffer contains data-writable blocks. A further improvement in the processing efficiency of the system can be expected if it is made possible for a plurality of processing entities to use the buffer simultaneously, i.e., if it is possible to facilitate multiaccessing.

The first method of the present invention realizes secure multiaccess to a buffer that has a plurality of blocks to be used cyclically in a predetermined order. This method includes: updating and retaining the block state information which indicates a busy, write-completed, or read-completed state; and moving the leading pointer and the following pointer under the constraint that the two pointers move in the same direction and do not pass each other.

Here, retaining the block state information provides a great advantage when achieving multiaccess.

After the block designated by the leading pointer starts to be written, the leading pointer is moved to a next block only if the next block is in the read-completed state. Here, the timing for movement of the leading pointer depends on the design of the system.

For example, in one possible system, if the block designated by the leading pointer starts to be written when the next block is already in the read-completed state, then the leading pointer is moved to the next block simultaneously with the start of the writing. On the other hand, if the block designated by the leading pointer starts to be written when the next block is not yet in the read-completed state, then the leading pointer may be moved to the next block at a point in time when the next block enters the read-completed state. In this case, the block designated by the leading pointer is in any of: the read-completed state; the busy state which indicates that the last block having started to be written is being written; and the write-completed state which indicates that this block has finished being written. The next producer searches for the leading pointer, checks whether or not this block is in the read-completed state, and can write if in the read-completed state.

Alternatively, in a simpler system, the leading pointer is configured to designate the last block that has started to be written. The next producer searches for the leading pointer, checks whether or not a block next to a block that is designated by the leading pointer is in the read-completed state, and moves the leading pointer to the next block and starts writing it if it is in the read-completed state.

In either system, even if one producer is writing, other producers can securely write other blocks based on the leading pointer and the block state information.

The same also applies to consumers. The combined use of the following pointer and the block state information allows a plurality of consumers to securely make a simultaneous read without locking the buffer.

Consequently, it is possible to realize secure multi-access using the processing entities.

A second embodiment according to the present invention is also a method for managing a buffer which is divided into a plurality of blocks, the blocks being used cyclically in a predetermined order by producers and consumers. The producers are processing entities for writing data. The consumers are processing entities for reading data written by the producers. This method also realizes secure multiaccess. Hereinafter, this method will be referred to as a second method.

Like the first method, this second method uses leading pointers and following pointers when specifying blocks for producers to write and specifying blocks for consumers to read. Here, for the sake of distinction from a second leading pointer and a second following pointer to be described later, a leading pointer and a following pointer that perform the same role as the leading pointer and the following pointer in the first method will be referred to as a first leading pointer and a first following pointer, respectively.

The second method includes: providing the first block to be written with a first leading pointer, a second leading pointer, a first following pointer, and a second following pointer all of which designate the block; and retaining block state information indicating whether associated blocks are write-completed or not, and whether they are read-completed or not. Then, after the first block to be written starts to be written, the positions of the pointers and the block state information are updated in accordance with the progress of writing and reading.

The second leading pointer follows the first leading pointer and is moved forward when the block designated thereby finishes being written.

The second following pointer follows the first following pointer and is moved forward when the block designated thereby finishes being read.

Moreover, in the second method, these four pointers are moved under the constraint that all the pointers move in the same direction, and the first leading pointer, the second leading pointer, the first following pointer, and the second following pointer do not pass each other in this order.

That is, according to this second method, blocks lying between the first following pointer and the second leading pointer in the moving direction of the pointers are in the write-completed state. Blocks lying between the first leading pointer and the second following pointer are ones in the read-completed state.

Consequently, when moving the first leading pointer forward, it is unnecessary to check whether the destination block is write-completed or not because the blocks up to the second following pointer are in the write-completed state. Similarly, when moving the first following pointer forward, it is unnecessary to check whether the destination block is read-completed or not because the blocks up to the second leading pointer are in the read-completed state.

In other words, the first leading pointer and the second following pointer can be used to designate blocks to be written and to protect data that is being read without locking the buffer.

The same applies consumers. The first following pointer and the second leading pointer can be used to designate blocks for consumers to read and to protect data that is being written without locking the buffer.

Now, the destinations of the second leading pointer and the second following pointer will be examined.

The second leading pointer is to be moved after the block designated thereby finishes being written. Blocks lying between the second leading pointer and the first leading pointer include blocks being written and blocks that have finished being written. The farther they are from the first leading pointer, the earlier the blocks have started to be written. Take, for example, the case where block A and block F are designated by the second leading pointer and the first leading pointer, respectively, and four blocks B, C, D, and E are arranged therebetween in the moving direction of the pointers. These six blocks have started to be written in order of A, B, C, D, E, and F.

Blocks that started to be written first will not necessarily finish being written first. For example, blocks B and C may finish being written while block A which is designated by the second leading pointer is still being written. When block A finishes being written, block C which has already finished being written cannot be used by consumers if the second leading pointer is simply moved to the next block (block B).

Accordingly, the second method of the present invention includes retaining information that indicates whether write-completed or not, included in the block state information. When block A finishes being written, the information indicating whether write-completed or not is referred to, and the second leading pointer is moved to a block (block D) next to a block (block C) that lies farthest from the second leading pointer among consecutive write-completed blocks (in this example, blocks B and C) subsequent to the block designated by the second leading pointer (in this example, block A). Consequently, even if the blocks do not finish being written in the starting order, it is possible to move the second leading pointer to the foremost block within the movable range, thereby providing write-completed blocks for consumers earlier.

The same applies to the second following pointer. Since information that indicates whether read-completed or not is retained, it is possible to move the second following pointer to the foremost block even if the blocks do not finish being read in the starting order. This makes it possible to provide read-completed blocks for producers earlier.

Furthermore, producers may sometimes fail to terminate processing even after the completion of writing if there is no information that indicates whether a block is write-completed or not. Take, for example, the producer that writes block B in the foregoing case. Even after the completion of writing, the producer must move the second leading pointer and thus cannot end processing until block A finishes being written and the second leading pointer can be moved to block B. The same applies to the producer of block C. In such situations, the producers of blocks B and C cannot be released from the processed data even after the completion of writing, which lowers the processing efficiency of the system.

Now, as in the second method of the present invention, information indicating whether write-completed or not shall be provided and producers that have finished writing, such as the producer of block B, shall update this information when finishing writing. Then, the producer of block A can refer to the information and move the second leading pointer accordingly. As a result, the producer of block B need not wait until block A finishes being written, and can end processing immediately after finishing writing.

The same also applies to reading.

As has been described, the second method of the present invention can also realize secure multiaccess. In addition, it is possible to avoid a drop in the processing efficiency of the system even if writing or reading is not finished in the starting order.

FIG. 1 shows the configuration of a multiprocessor system 100 which is a first embodiment of the present invention. The multiprocessor system 100 has a plurality of processing units 10A, a plurality of processing units 10B, and a shared memory 50. Each of the processing units is connected to the shared memory 50.

In the multiprocessor system, individual processors are included in the respective processing units. These processing units are classified into main processing units and sub processing units. The sub processing units may all be formed using an identical architecture, or may have different configurations. The main processing units may be positioned locally to the sub processing units, such as on the same chip, the same package, the same circuit board, or the same product as the sub processing units. The main processors may alternatively be positioned remotely from the sub processing units, such as on a product that is connectable over a bus, the Internet, or other communication networks. Similarly, the sub processing units may be positioned locally to or remotely from each other.

The plurality of processing units 10A and 10B in the multiprocessor system 100 shown in FIG. 1 may include main processing units.

The processing units 10A each have a processor 12A and a local memory 14A. The processing units 10B each have a processor 12B and a local memory 14B. The processor 12A is capable of reading and writing data from/to the local memory 14A. The processor 12B is capable of reading and writing data from/to the local memory 14B.

The multiprocessor system 100 pertains to the transfer of stream data. Each of the processing units 10A writes a predetermined transfer unit of stream data (hereinafter, referred to simply as data) to a buffer 20 to be described later, which is formed in the shared memory 50. Each of the processing units 10B reads data written by the processing units 10A and transfers the same. Here, since the processing units 10A write data to the buffer 20, the processors 12A serve as producers. Since the processing units 10B read data, the processors 12B serve as consumers.

One of the processing units 10A or the processing units 10B performs the role of a service unit with respect to the other processing units when using the buffer 20. The role of the service unit includes, for example, the initial setup of the buffer 20 and the initialization of pointers to be described later. Any of the processing units may be in charge of this service unit. If the processing units 10A or the processing units 10B include any main processing unit, it is preferable, though not restrictive, that the main processing unit be in charge of this service unit.

Figure 2:
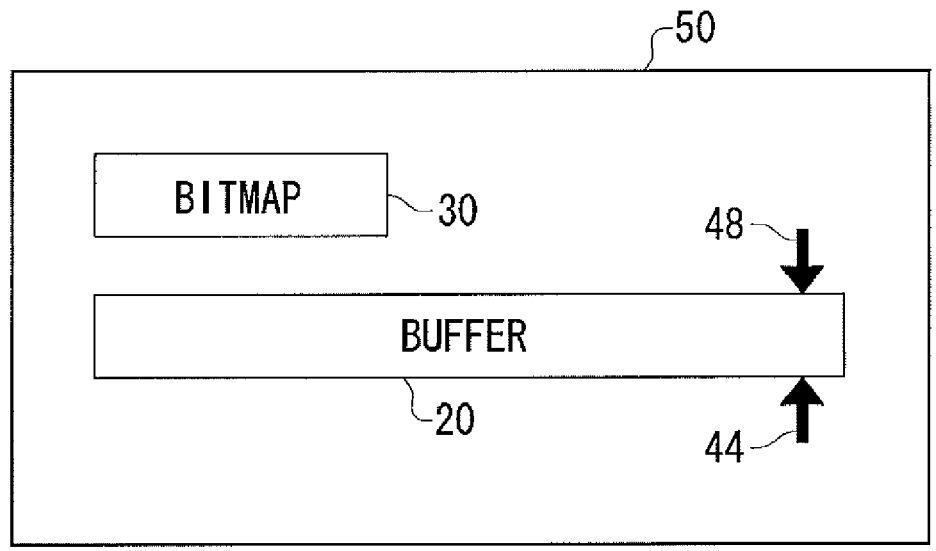
FIG. 2 is a diagram showing a shared memory of the multiprocessor system shown in FIG. 1.

FIG. 2 shows the shared memory 50. The shared memory 50 has a buffer 20 and a bitmap 30. The buffer 20 is provided with a leading pointer 44 and a following pointer 48.

Figure 3:
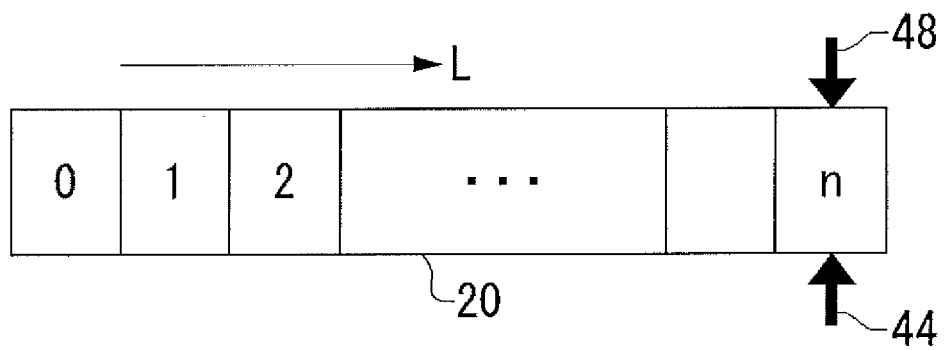
FIG. 3 is a diagram showing the initial state of a buffer which is formed in the shared memory shown in FIG. 2.

FIG. 3 shows the buffer 20. The buffer 20 is divided into a plurality of consecutive blocks. The blocks are used cyclically in succession in a predetermined order as shown by the arrow L in the diagram, for example. Here, the first block to be written is the zeroth block shown in FIG. 3. The leading pointer 44 and the following pointer 48 are initially positioned at the block used immediately before the zeroth block when the blocks are used cyclically (in the diagram, the nth block).

The service unit determines which block to start writing first, sets the pointers, determines the initial positions of the pointers, etc.

Figure 4:
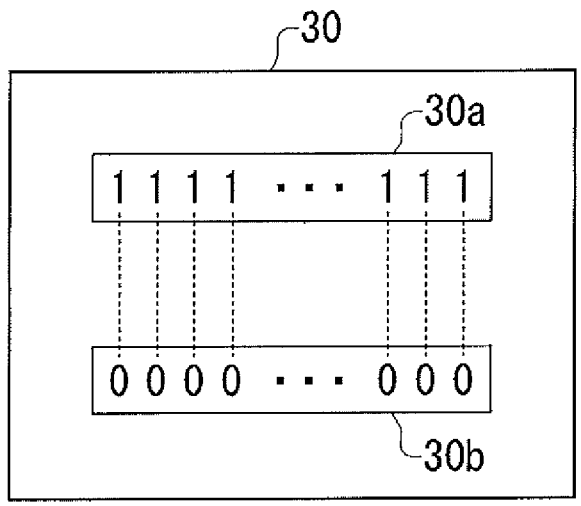
FIG. 4 is a diagram showing the initial state of a bitmap which is retained in the shared memory shown in FIG. 2.

FIG. 4 shows the bitmap 30 in an initial state. As shown in the diagram, the bitmap 30 has a bit string 30a and a bit string 30b, in both of which each single bit is assigned to one block of the buffer 20. The bitmap 30 is the block state information for indicating whether the blocks are busy (being written or read), write-completed, or read-completed.

As shown in FIG. 4, each bit of the bit string 30a has an initial value of 1. Each bit of the bit string 30b has an initial value of 0.

FIG. 5 is a diagram showing processing whereby any one of the producers 12A moves the leading pointer 44 when writing stream data to the buffer 20. This producer 12A initially searches for the leading pointer 44 of the buffer 20. Since the leading pointer 44 designates the nth block, the producer 12 refers to the bit string 30a to check the value of the bit corresponding to a block next to the nth block, i.e., the zeroth block. Here, the bit corresponding to the zeroth block has the initial value of 1. The producer 12A therefore moves the leading pointer 44 to the zeroth block, starts writing to the zeroth, and changes the value of the bit corresponding to the zeroth block in the bit string 30a to 0.

At this point, if another producer 12A is ready for a write, this producer 12A also initially searches for the leading pointer 44 of the buffer 20. Since the leading pointer 44 is positioned at the zeroth block, this producer refers to the bit string 30a to find that the bit corresponding to the first block is 1 in value. The producer moves the leading pointer 44 to the first block, starts writing to the first block, and changes the value of the bit corresponding to the first block in the bit string 30a to 0.

Similarly, another producer 12A that is ready for a write can also perform the processing of moving the leading pointer 44 to the second block, starting writing to the second block, and changing the value of the bit corresponding to the second block in the bit string 30a to 0.

Moreover, if any of the blocks has finished being written, the producer 12A having written this changes the value of the bit corresponding to this block in the bit string 30b to 1. Suppose here that the zeroth and second blocks have finished being written, and the bits corresponding to the zeroth and second blocks in the bit string 30b are changed to 1 in value.

When any one of the consumers 12B starts reading, it initially searches for the following pointer 48 of the buffer 20. In an initial state, the following pointer 48 designates the nth block. The producer 12 thus refers to the bit string 30b to check the value of the bit corresponding to a block next to the nth block, i.e., the zeroth block. At this point, if the bit corresponding to the zeroth block is 0 in value, it indicates that the zeroth block is in an unwritten initial state or is still being written. If the bit value is 1, it indicates that the zeroth block has finished being written. Only if the bit corresponding to the zeroth block in the bit string 30b is 1 in value, the consumer 12B moves the following pointer 48 to the zeroth block, starts reading from the zeroth block, and changes the value of the bit corresponding to the zeroth block in the bit string 30b to 0.

FIG. 6 shows the state of the buffer 20 and the bit strings 30a and 30b here. At this point in time, as shown in the diagram, the leading pointer 44 designates the second block, which is the latest to start being written. The following pointer 48 designates the zeroth block, which is the latest to start being read. The zeroth and first blocks are busy, and the second block is in the write-completed state. This state can be read from the bit string 30a and the bit string 30b, which will be described later.

Subsequently, the producers 12A and the consumers 12B repeat writing and reading. With the progress of writing and reading, the positions of the leading pointer 44 and the following pointer 48, the bit string 30a, and the bit string 30b are updated.

Updating of the bit string 30a, specifically, is such that when a block finishes being read, the bit value of this block is set to 1 by the consumer 12B that has read it. Then, when this block starts to be written, the bit value is reset to 0 by the producer 12A that starts writing it.

Updating of the bit string 30b, specifically, is such that when a block finishes being written, the bit value of this block is set to 1 by the producer 12A that has written it. Then, when this block starts to be read, the bit value is reset to 0 by the consumer that starts reading it.

Consequently, as shown in FIG. 7, the bit values of the bit string 30a and the bit values of the bit string 30b can indicate which states the blocks corresponding to the bits are in, busy, write-completed, or read-completed.

Moreover, the leading pointer 44 designates the last block that has started to be written. Producers 12A, when writing, search for the leading pointer 44 of the buffer 20 and refer to the bit string 30a to check whether or not a block next to the block that is designated by the leading pointer 44 is in the read-completed state. If the value of the bit corresponding to this block in the bit string 30a is 1, i.e., if this block is in the read-completed state, they move the leading pointer 44 to this block, start writing, and reset the value of the bit corresponding to this block in the bit string 30a to 0.

The following pointer 48 designates the last block that has started to be read. Consumers 12B, when reading, search for the following pointer 48 of the buffer 20 and refer to the bit string 30b to check whether or not a block next to the block that is designated by the following pointer 48 is in the write-completed state. If the value of the bit corresponding to this block in the bit string 30b is 1, i.e., if this block is in the write-completed state, they move the following pointer to this block, start reading, and reset the value of the bit corresponding to this block in the bit string 30b to 0.

The producers 12A and the consumers 12B move the pointers under the constraint that the two pointers move in the same direction and do not pass each other.

As above, according to the multiprocessor system 100 shown in FIG. 1, the combined use of the bitmap 30 and the two pointers makes it possible to realize secure multiaccess.

Figure 8:
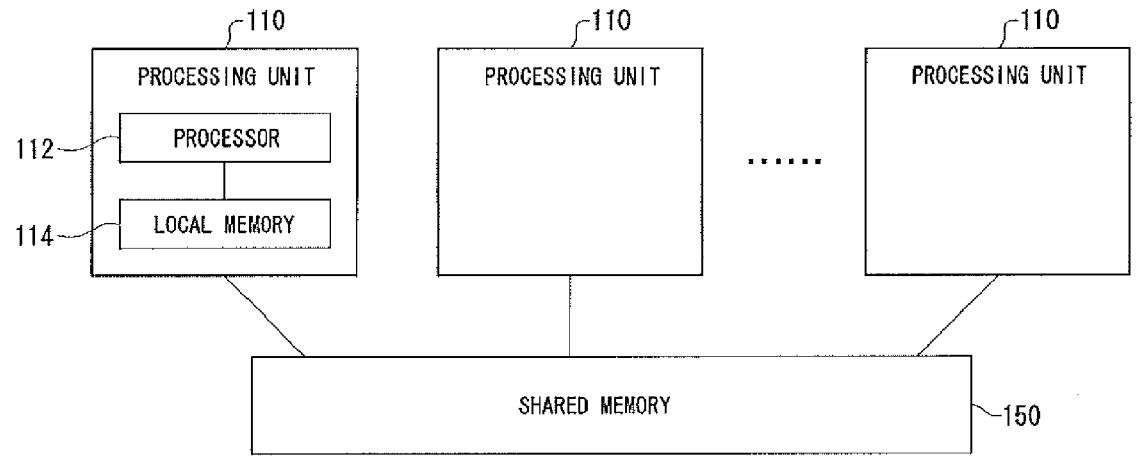
FIG. 8 is a diagram showing a multiprocessor system which is a second embodiment according to the present invention.

FIG. 8 shows the configuration of a multiprocessor system 200 which is a second embodiment of the present invention. The multiprocessor system 200 has a plurality of processing units 110 and a shared memory 150. Each of the processing units 110 is connected to the shared memory 150. The plurality of processing units 110 in the multiprocessor system 200 may include main processing units.

The processing units 110 each have a processor 112 and a local memory 114. The processor 112 is capable of reading and writing data from/to the local memory 114.

In the multiprocessor system 200, the processing units 110 perform processing in parallel. The processors 112 individually write processed data to a buffer 120 to be described later, and then copy data written by other processing units 110 from the buffer 120 into their respective local memories 114 for processing. That is, the processors 112 included in the processing units 110 can serve as both producers and consumers. In the following description, an identical processor may be referred to as a producer or a consumer depending on whether it writes or reads data.

Any one of the processing units 110 performs the role of a service unit with respect to the other processing units when using the buffer 120. The role of the service unit includes, for example, the initial setup of the buffer 120 and the initialization of pointers to be described later. Any of the processing units may be in charge of this service unit. If the processing units 110 include any main processing unit, it is preferable, though not restrictive, that the main processing unit be in charge of this service unit.

Figure 9:
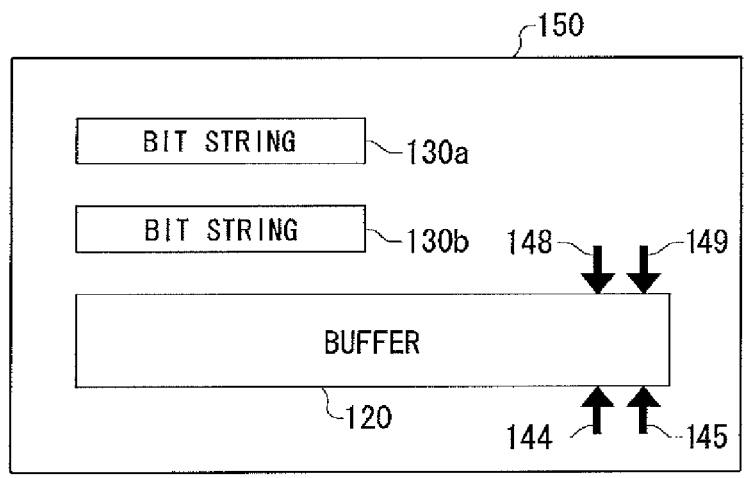
FIG. 9 is a diagram showing the shared memory of the multiprocessor system shown in FIG. 8.

FIG. 9 shows the shared memory 150. The shared memory 150 has the buffer 120, a bit string 130a, and a bit string 130b. The buffer 120 is provided with a first leading pointer 144, a second leading pointer 145, a first following pointer 148, and a second following pointer 149. The bit string 130a has a bit width equal to the number of producers which can access at a time. The bit string 130b has a bit width equal to the number of consumers which can access at a time. For example, suppose here that there are eight processing units 110. Since each processor 112 can serve as both a producer and a consumer, the bit string 130a and the bit string 130b here have a bit width of 8 bits.

Figure 10:
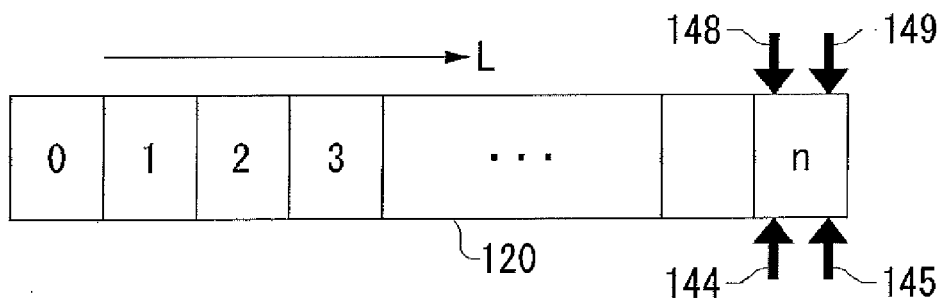
FIG. 10 is a diagram showing the initial state of the buffer which is formed in the shared memory shown in FIG. 9.

FIG. 10 shows the buffer 120. The buffer 120 is divided into a plurality of consecutive blocks. The blocks are used cyclically in succession in a predetermined order as shown by the arrow L in the diagram, for example. Here, the first block to be written is the zeroth block shown in FIG. 10. All the pointers are initially positioned at the block used immediately before the zeroth block when the blocks are used cyclically (in the diagram, the nth block).

The service unit determines which block to start writing first, sets the pointers, and determines the initial positions of the pointers.

Each bit of the bit string 130a, when it has a value of 1, indicates that the block corresponding to the bit is in a write-completed state. When it has a value of 0, it indicates that the block corresponding to the bit is in a state other than the write-completed state.

Each bit of the bit string 130b, when it has a value of 1, indicates that the block corresponding to the bit is in a read-completed state. When it has a value of 0, it indicates that the block corresponding to the bit is in a state other than the read-completed state.

Figure 11:
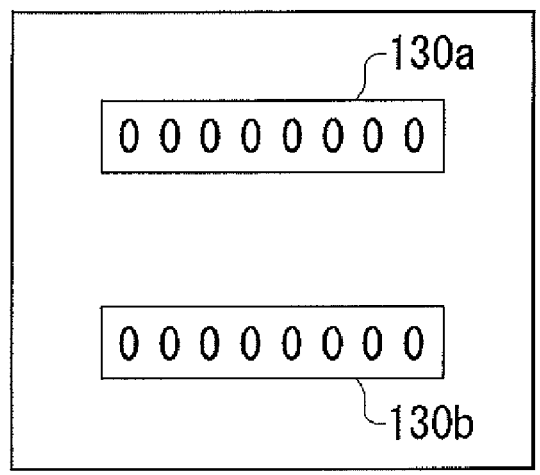
FIG. 11 is a diagram showing the initial states of two bit strings which are retained in the shared memory shown in FIG. 9.

FIG. 11 shows the bit string 130a and the bit string 130b in an initial state. As shown in the diagram, the bits of both the two bit strings have a value of 0 in the initial state.

Figure 12:
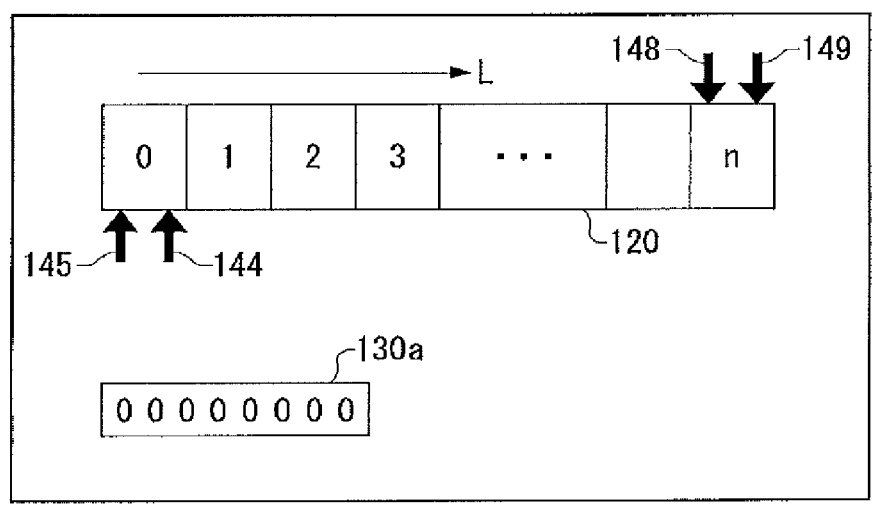
FIG. 12 is a diagram (1) for explaining the movement of the pointers and the updating of the bit strings.

FIG. 12 is a diagram showing processing to be performed by the service unit before any one of the processing units 110 starts writing. As shown in the diagram, before any one of the processing units writes data to the buffer 120, the service unit moves the first leading pointer 144 and the second leading pointer 145 from their initial positions, or the nth block, to the zeroth block at the top. It also assigns the bits of the bit string 130a to a total of eight blocks from the zeroth block to the seventh block.

At this point, in order to write data, one of the producers 112 initially searches for the first leading pointer 144 of the buffer 120. In this case, the first leading pointer 144 designates the zeroth block. The producer 112 thus copies data from its local memory 114 to the zeroth block for a write. When it starts writing to the zeroth block, this producer 112 moves the first leading pointer 144 to the next block, i.e., the first block.

At this point, if another producer 112 is ready for a write, this producer 112 also initially searches for the leading pointer 144 of the buffer 120.

Figure 13:
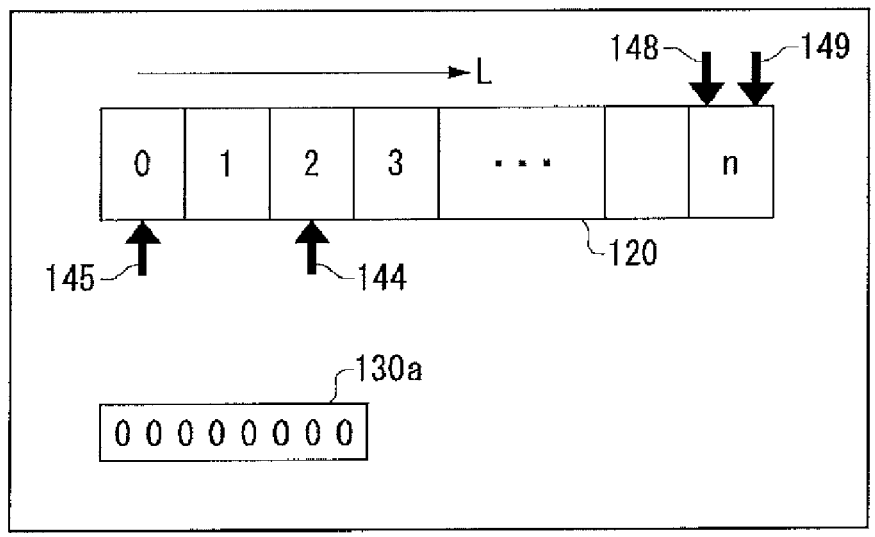
FIG. 13 is a diagram (2) for explaining the movement of the pointers and the updating of the bit strings.

Since the first leading pointer 144 is positioned at the first block, this producer 112 starts writing to the first block and moves the first leading pointer 144 to the next block, i.e., the second block. FIG. 13 shows the positions of the respective pointers and the values of the respective bits of the bit string 130*a* at this point. The first leading pointer 144 is on the second block, and the second leading pointer 145 is on the zeroth block. The bits of the bit string 130*a* remain 0 in value, indicating that none of blocks from the zeroth block to the seventh block is write-completed.

When the zeroth block finishes being written, the producer 112 that has written it moves the second leading pointer 145. The destination will be described later. When moving the second leading pointer 145, it also assigns the bit string 130*a* to eight consecutive blocks starting from the destination block.

When the bit of the zeroth block in the bit string 130*a* is set to 1, the service unit moves the first following pointer 148 and the second following pointer 149 to the zeroth block and assigns the bits of the bit string 130*b* to a total of eight blocks from the zeroth block to the seventh block. Subsequently, the management of the buffer 120 is passed over to the individual processing units.

Producers 112 and consumers 112 then repeat writing and reading. With the progress of writing and reading, the positions of the four pointers, the bit string 130*a*, and the bit string 130*b* are updated. In the following description, the producers 112 and the consumers 112 shall move the pointers under the constraints that the four pointers move in the same direction, and the first leading pointer 144, the second leading pointer 145, the first following pointer 148, and the second following pointer 149 do not pass each other in this order.

When a producer 112 writes data, it searches for the first leading pointer 144 of the buffer 120, and writes to the block that is designated by the first leading pointer 144. When it starts writing, it also moves the first leading pointer 144 to the next block.

When a block other than that designated by the second leading pointer 145 finishes being written, the producer 112 that has written this sets the value of the corresponding bit in the bit string 130*a* to 1, and ends processing.

When a consumer 112 reads data, it searches for the first following pointer 148 of the buffer 120 and reads from the block that is designated by the first following pointer 148. When it starts reading, it also moves the first following pointer 148 to the next block.

When a block other than that designated by the second following pointer 149 finishes being read, the producer 112 that has read this sets the value of the corresponding bit in the bit string 130*b* to 1, and ends processing.

The second leading pointer 145 is to be moved after the block designated by this pointer finishes being written. The second following pointer 149 is to be moved after the block designated by this pointer finishes being read. Now, taking the state of FIG. 14 as an example, description will be given of the processing to be performed by a consumer 112 when the block designated by the second following pointer 149 finishes being read.

Figure 14:
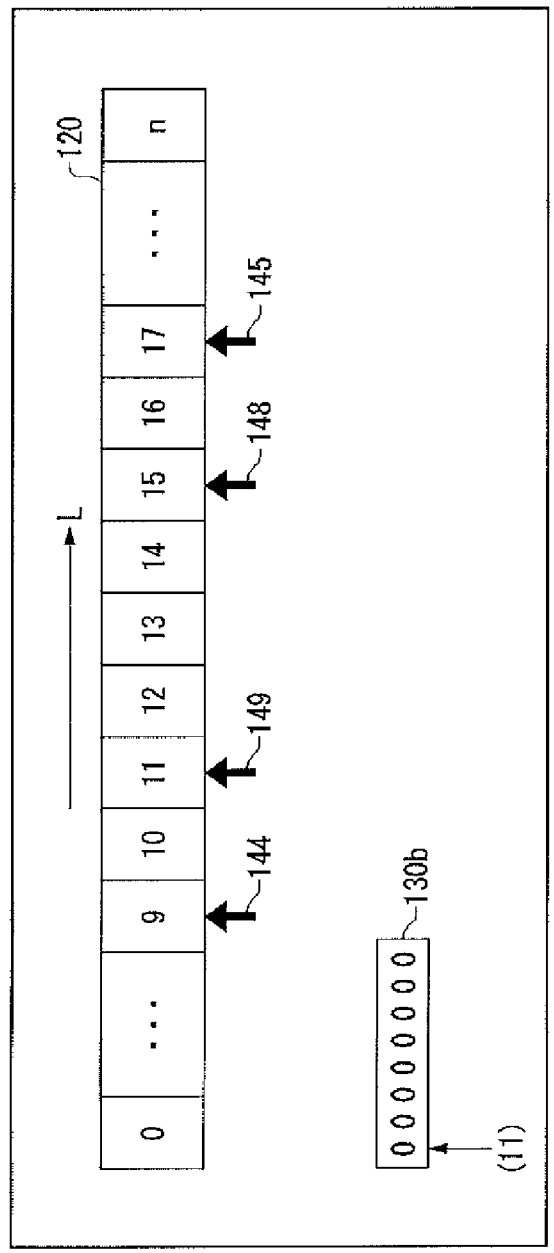
FIG. 14 is a diagram for explaining how the destination of the second following pointer is determined and the bit string is updated after the block designated by the second following pointer finishes being read.

In the example of FIG. 14, the first leading pointer 144 is moved to the ninth block, and the second leading pointer 145 is moved to the seventeenth block. The first following pointer 148 is moved to the fifteenth block, indicating that the blocks up to the fourteenth have started to be read. The second following pointer 149 is moved to the eleventh block, indicating that the blocks up to the tenth have finished being read.

Suppose here that the four blocks eleventh to fourteenth have already started to be read but none have finished. The bit string 130*b* is assigned to eight blocks starting from the eleventh, and all the bits are 0 in value. The bit string 130*b* is intended to determine the destination of the second following pointer 149. Since the second following pointer will not pass the first following pointer 148, all the bits of the blocks ahead of the first following pointer are given a value of 0.

The four blocks eleventh to fourteenth have started to be read in order of 11, 12, 13, and 14. However, the finishing order is not necessarily the same as the starting order. Suppose here that the order of finishing reading is 13, 12, 11, and 14.

When the thirteenth block finishes being read while the eleventh, twelfth, and fourteenth blocks are still being read, the consumer 112 that has read it sets the value of the bit corresponding to the thirteenth block in the bit string 130*b* (in this case, the third bit) to 1, and ends processing.

When the consumer 112 of the twelfth block finishes reading, it also sets the value of the bit corresponding to the twelfth block in the bit string 130*b* (in this case, the second bit) to 1, and ends processing.

Subsequently, the eleventh block finishes being read. Since the eleventh block is designated by the second following pointer 149, the consumer 112 that has read it sets the value of the bit corresponding to the eleventh block in the bit string 130*b* (the first bit) to 1, determines the destination of the second following pointer, and moves it.

Figure 15:
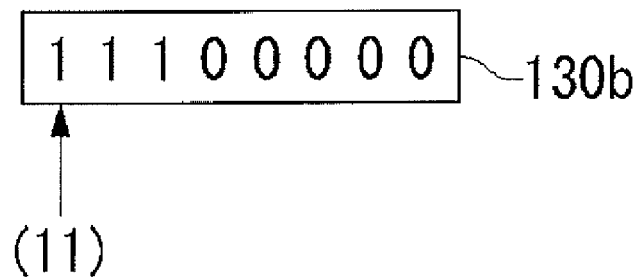
FIG. 15 is a diagram showing the bit string updated after the block designated by the second following pointer finishes being read.

Here, as shown in FIG. 15, the bits of the bit string 130*b* are such that the bits corresponding to the read-completed blocks, or the eleventh, twelfth, and thirteenth blocks, are 1 in value and the other bits are 0 in value.

When determining the destination, the consumer 112 uses an atomic command such as clz to determine the number of consecutive bits having a value of 1, starting from the top bit of the bit string 130*b*. In the example shown in FIG. 15, the result obtained is 3. The consumer 112 moves the second following pointer 149 ahead by a number of blocks equal to the result obtained. In the example shown in FIG. 14, the second following pointer 149 is moved from the eleventh block to the fourteenth block.

Moreover, after moving the second following pointer 149, this consumer 112 assigns the bit string 130*b* to eight blocks starting from the current position of the second following pointer 149, and ends processing.

In other words, when the block designated by the second following pointer 149 finishes being read, the consumer 112 that has read it sets the value of the bit corresponding to this block in the bit string 132*b* to 1. It also moves the second following pointer 149 to a block next to a block that is farthest from the second following pointer among consecutive read-completed blocks subsequent to the block designated by the second following pointer 149. It then assigns the bit string 130*b* to eight blocks starting from the current position of the second following pointer 149.

Figure 16:
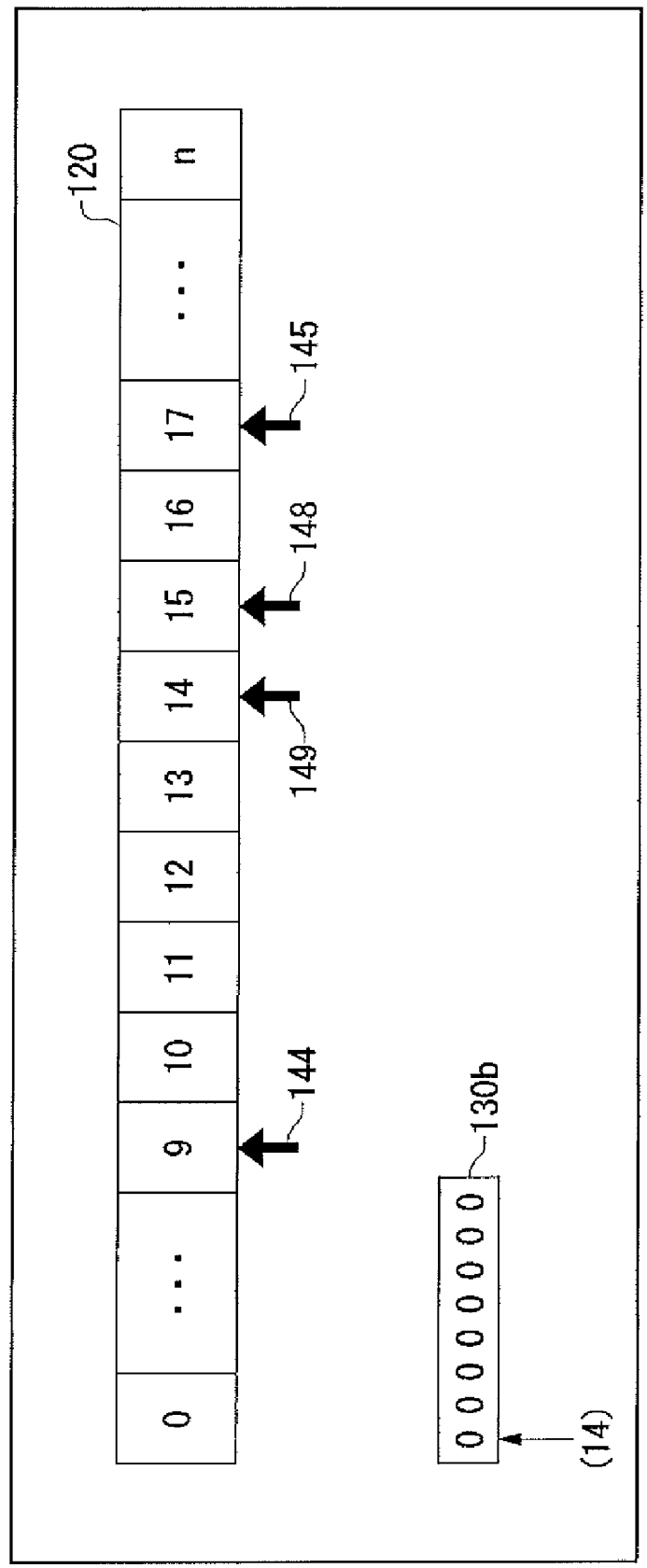
FIG. 16 is a diagram showing the state of the buffer and the bit string after the second following pointer is moved.

FIG. 16 shows the pointer positions and the bit string 130*b* at this time. The second following pointer 149 is moved to the fourteenth block, and the bit string 130*b* is assigned to eight blocks starting from the fourteenth.

The same applies to the second leading pointer 145. When a block designated by the second leading pointer 145 finishes being written, the producer 112 that has written it sets the value of the bit corresponding to this block in the bit string 132*a* to 1. It also moves the second leading pointer 145 to a block next to a block that is farthest from the second leading pointer among consecutive write-completed blocks subsequent to the block designated by the second leading pointer 145. It then assigns the bit string 130*a* to eight blocks starting from the current position of the second leading pointer 145, and ends processing.

As above, according to the multiprocessor system 200 shown in FIG. 8, the four pointers and the two bit strings are used to update the pointer positions and the bit strings according to the progress of writing and reading. This realizes secure multiaccess without locking the buffer. Furthermore, it is possible to avoid a drop in system efficiency even if writing or reading is not completed in the same order as the starting order.

Moreover, the information that indicates whether blocks are write-completed or not (the bit string 130a) is retained for only eight consecutive blocks subsequent to the second leading pointer 145. This makes it possible to provide information necessary for moving the second leading pointer 145 while reducing the bit width of the bit string 130a. The same applies to the bit string 130b. This also contributes to improved processing efficiency of the system.

Furthermore, moving the second leading pointer 145 requires the bit string 130a alone, and moving the second following pointer 149 requires the bit string 130b alone. Here, since the bit string 130a and the bit string 130b are retained separately, producers refer only to the area that contains the bit string 130a when moving the second leading pointer 145. Consumers refer only to the area that contains the bit string 130b when moving the second following pointer 140. This facilitates simple processing.

The buffer managing method used in this second embodiment may be applied not only to a multiprocessor system as shown in FIG. 8, but also to any multiprocessor systems in which data is exchanged between processors, such as the multiprocessor system for transferring stream data shown in FIG. 1.

Figure 17:
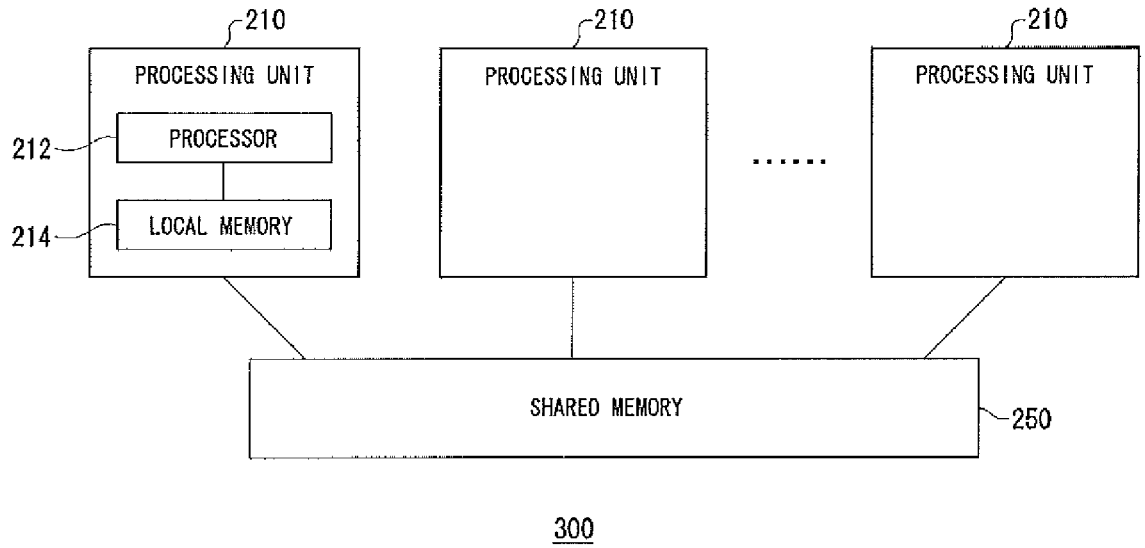
FIG. 17 is a diagram showing a multiprocessor system which is a third embodiment of the present invention.

FIG. 17 shows a multiprocessor system 300 which is a third embodiment of the present invention.

The multiprocessor system 300 has a plurality of processing units 210 and a shared memory 250. Each of the processing units 210 is connected to the shared memory 250. The plurality of processing units 210 in the multiprocessor system 300 may include main processing units.

The processing units 210 each have a processor 212 and a local memory 214. The processor 212 is capable of reading and writing data from/to the local memory 214.

In the multiprocessor system 300, the processing units 210 perform processing in parallel. The processors 212 individually write processed data to a buffer 220 to be described later, and then copy data written by other processing units 210 from the buffer 220 into their respective local memories 214 for processing. That is, the processors 212 included in the processing units 210 can serve as both producers and consumers. In the following description, an identical processor may be referred to as a producer or a consumer depending on whether it writes or reads data.

Any one of the processing units 210 performs the role of a service unit with respect to the other processing units when using the buffer 220. The role of the service unit includes, for example, the initial setup of the buffer 220 and the initialization of a bit string to be described later. Any one of the processing units may be in charge of this service unit. If the processing units 210 include any main processing unit, it is preferable, though not imperative, that the main processing unit be in charge of this service unit.

Figure 18:
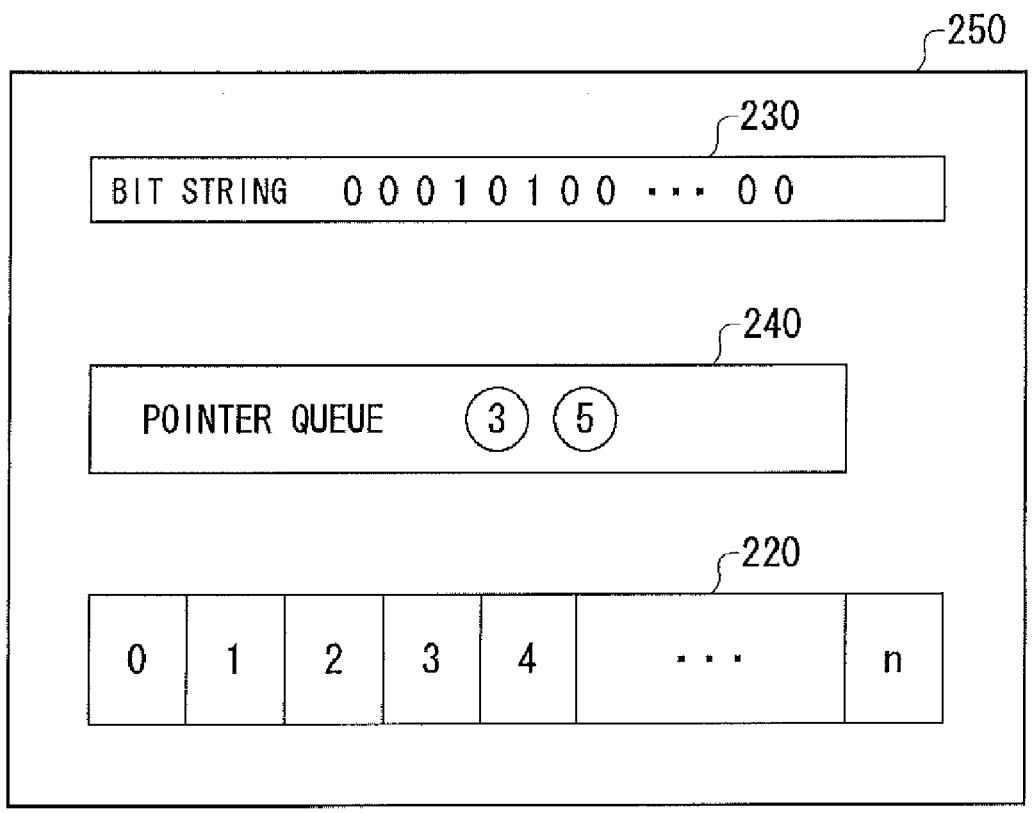
FIG. 18 is a diagram showing the shared memory of the multiprocessor system shown in FIG. 17.

FIG. 18 shows the shared memory 250. The shared memory 250 has the buffer 220, a bit string 230, and a pointer queue 240.

The buffer 220 is divided into a plurality of consecutive blocks. Identifiers (here, block numbers) are given to the respective blocks.

The bit string 230 has a bit width equal to the number of blocks included in the buffer 220, and the individual bits correspond to the respective blocks. The initial values of all the bits are 0.

The pointer queue 240 retains the numbers of write-completed blocks in order of completion of writing. In an initial state, it is empty.

When a producer 212 is starting to write, it selects a block that corresponds to a bit having a value of 0 in the bit string 230 as a writable block, and starts writing to this block. When it starts writing to the block, the producer 212 sets the value of the bit corresponding to this block in the bit string 230 to 1.

When it finishes writing, the producer 212 puts the number of the write-completed block into the pointer queue 240, and ends processing.

When a consumer 212 is starting to read, it refers to the pointer queue 240, deletes the number of the earliest write-completed block from the pointer queue 240, and reads data from the block corresponding to this number. When it finishes reading, it resets the value of the bit corresponding to this block in the bit string 230 to 0.

In other words, the bit string 230 indicates whether each block is in the read-completed state or in the other states. Whether put in the pointer queue 240 or not indicates whether a block is in the write-completed state or in the other states. If there is a plurality of blocks in the write-completed state, the order of completion is also indicated.

In this way, the multiprocessor system 300 also realizes secure multiaccess.

It will be understood that the buffer managing method used in this third embodiment may be applied not only to a multiprocessor system as shown in FIG. 17, but also to any multiprocessor systems in which data is exchanged between processors, such as the multiprocessor system for transferring stream data shown in FIG. 1.

Up to this point, the present invention has been described in conjunction with the embodiments thereof. The foregoing embodiments have been given solely by way of illustration. It will be understood by those skilled in the art that various modifications may be made to combinations of the foregoing components and processes without departing from the gist of the present invention, and all such modifications are also intended to fall within the scope of the present invention.

For example, in the multiprocessor systems according to the embodiments shown in FIGS. 1 and 8, the bit strings are updated and retained in atomic areas on the shared memory so that the buffer on the shared memory is synchronized as well. However, the functions of these bit strings may be implemented as a library, so that the buffer is implemented on the local memories of the producers or the local memories of the consumers.

Considering that producers and consumers require different information, the shared memory may be omitted in an alternative mode of implementation. For example, in the system according to the embodiment shown in FIG. 1, the producer-required information is the information indicating whether blocks are read-completed or not (in the embodiment shown in FIG. 1, the bit string 30a) and the leading pointer. The consumer-required information is the information indicating whether blocks are write-completed or not (in the embodiment shown in FIG. 1, the bit string 30b) and the following pointer. The leading pointer and the following pointer thus need not be shared between producers and consumers. If there are one producer and one consumer, the producer and the consumer can use message passing techniques to transmit each other's necessary information to each other, thereby sharing information that must be shared. More specifically, when the producer finishes writing, it updates write completion information and transmits the same to the consumer. The consumer ORs the received information and its own write completion information into, for example, a bit string for cumulative update. The same applies to read completion information. When the consumer completes reading, it updates the read completion information and transmits the same to the producer. The producer updates the received information and its own read completion information by, for example, using an OR command. Such a mode of implantation can achieve buffer synchronization without using a shared memory for storing bit strings.

Furthermore, the foregoing embodiments have dealt with examples where the processing entities are processors, and the system itself is configured as a multiprocessor system. However, the buffer management technology according to the present invention is also applicable to multitask systems in which the processing entities are tasks (including processes, threads, and so on).

As above, the present invention may be applied to electronic equipment which processes a plurality of tasks in parallel, such as a computer, a cellular phone, or a game console.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for managing a sequential buffer which is divided into a plurality of blocks and capable of being simultaneously accessed by a plurality of processing entities, the blocks being used cyclically in order by at least two processing entities comprising a producer and a consumer as a temporary storage location for data to be transferred between the processing entities, the producer being a processing entity for writing data, the consumer being a processing entity for reading data written by the producer, the method comprising:

updating and retaining block state information including at least two strings comprising bits, wherein each of the bits is assigned to indicate a state of a respective one of the plurality of buffer blocks such that bits of a first of the at least two strings indicate a write-completed state of respective buffer blocks and bits of a second of the at least two strings indicate a read-completed state of the respective buffer blocks;

providing a first leading pointer, a second leading pointer, a first following pointer, and a second following pointer each of which points to one of the blocks and moves in the order of the block sequence under a constraint that all the pointers move in the same direction, and the first leading pointer, the second leading pointer, the first following pointer, and the second following pointer do not pass each other in this order;

when the producer writes data, determining the block designated by the first leading pointer as a block to be written, and moving the first leading pointer to a next block, after the block designated by the second leading pointer finishes being written, moving the second leading pointer to a block next to a block that is farthest from the second leading pointer among consecutive write-completed blocks subsequent to the block designated by the second leading pointer, the consecutive write-completed blocks being indicated by bits of the first string, when the consumer reads data, determining the block designated by the first following pointer as a block to be read, and moving the first following pointer to a next block, and after the block designated by the second following pointer finishes being read, moving the second following pointer to a block next to a block that is farthest from the second following pointer among consecutive read-completed blocks subsequent to the block designated by the second following pointer, the consecutive read-completed blocks being indicated by bits of the second string.

2. The method for managing a buffer according to claim 1, wherein: the second string is retained only for as many consecutive blocks equal to a number of producers capable of accessing the buffer at a time, the consecutive blocks starting from the block designated by the second leading pointer; and the first string is retained only as many consecutive blocks equal to the number of consumers capable of accessing the buffer at a time, the consecutive blocks starting from the block designated by the second following pointer.

3. The method for managing a buffer according to any one of claim 1, wherein: the processing entities are processors; and the block state information is updated and/or the pointers are moved by processors that write or read, or processors that have written or read.

4. The method for managing a buffer according to claim 1, wherein: the two bit strings are updated by an atomic operation.

5. An apparatus for managing a buffer which is sequentially divided into a plurality of blocks and capable of being simultaneously accessed by a plurality of processing entities, the blocks being used cyclically in order by a producer and a consumer as a temporary storage location for data to be transferred between processing entities, the producer being a processing entity for writing data, the consumer being a processing entity for reading data written by the producer, the apparatus comprising:

a block state information retaining part which retains block state information in at least two strings comprising bits, wherein each of the bits is assigned to indicate a state of respective one of the buffer blocks such that bits of a first of the at least two strings indicate a write-completed state of respective buffer blocks and bits of a second of the at least two strings indicate a read-completed state of the respective buffer blocks;

a block state information updating part which updates the block state information;

a pointer setting part which provides a first leading pointer, a second leading pointer, a first following pointer, and a second following pointer each of which points to one of the blocks and moves in the order of the block sequence under a constraint that all the pointers move in the same direction, and the first leading pointer, the second leading pointer, the first following pointer, and the second following pointer do not pass each other in this order;

a pointer moving part which, when the producer writes data, determines the block designated by the first leading pointer as a block to be written, and moves the first leading pointer to a next block, after the block designated by the second leading pointer finishes being written, moves the second leading pointer to a block next to a block that is farthest from the second leading pointer among consecutive write-completed blocks subsequent to the block designated by the second leading pointer, the consecutive write-completed blocks being indicated by bits of the first string, when the consumer reads data, determines the block designated by the first following pointer as a block to be read, and moves the first following pointer to a next block, and after the block designated by the second following pointer finishes being read, moves the second following pointer to a block next to a block that is farthest from the second following pointer among consecutive read-completed blocks subsequent to the block designated by the second following pointer, the consecutive read-completed blocks being indicated by bits of the second string.

6. The apparatus for managing a buffer according to claim 5, wherein the block state information retaining part retains the first string only for as many consecutive blocks equal to the number of producers capable of accessing the buffer at a time, the consecutive blocks starting from the block designated by the second leading pointer, and retains the second string only for as many consecutive blocks equal to the number of consumers capable of accessing the buffer at a time, the consecutive blocks starting from the block designated by the second following pointer.

7. The apparatus for managing a buffer according to claim 5, wherein: the processing entities are processors; and the block state information updating part and/or the pointer moving part is/are composed of processors that write or read, or processors that have written or read.

8. The apparatus for managing a buffer according to claim 5, wherein: the block state updating part updates the at least two strings by an atomic operation.

9. A computer program product for managing a buffer encoded in a non-transitory computer readable recording medium, the buffer is divided into a plurality of sequential blocks and capable of being accessed simultaneously by a plurality of processing entities, the blocks being used cyclically in order by the processing entities including producers and consumers as a temporary storage location for data to be transferred therebetween, the producers being processing entities for writing data, the consumers being processing entities for reading data written by the producers, the computer program product comprising:

a program code module for retaining block state information to be updated in accordance with progress of writing and reading, the block state information is retained in at least two strings comprising bits, wherein each of the bits is assigned to indicate a state of respective one of the buffer blocks such that bits of a first of the at least two strings indicate a write-completed state of respective buffer blocks and bits of a second of the at least two strings indicate a read-completed state of the respective buffer blocks;

a program code module for providing a first leading pointer, a second leading pointer, a first following pointer, and a second following pointer, each of which points to one of the blocks in the order of the block sequence under a constraint that the pointers move in the same direction and the first leading pointer, the second leading pointer, the first following pointer, and the second following pointer do not pass each other in such order;

a program code module for determining the block designated by the first leading pointer as a block to be written, and moving the first leading pointer to a next block, when the producer writes data;

a program code module for moving the second leading pointer to a block next to a block that is farthest from the second leading pointer among consecutive write-completed blocks subsequent to the block designated by the second leading pointer, the consecutive write-completed blocks being indicated by bits of the first string after the block designated by the second leading pointer finishes being written;

a program code module for determining the block designated by the first following pointer as a block to be read, and moving the first following pointer to a next block, when the consumer reads data; and a program code module for moving the second following pointer to a block next to a block that is farthest from the second following pointer among consecutive read-completed blocks subsequent to the block designated by the second following pointer, the consecutive read-completed blocks being indicated by bits of the second string after the block designated by the second following pointer finishes being read.

10. A non-transitory computer readable recording medium containing a program for managing a buffer which is sequentially divided into a plurality of blocks and capable of being simultaneously accessed by a plurality of processing entities, the blocks being used cyclically in order by the processing entities comprising at least a producer and a consumer as a temporary storage location for data to be transferred there between, the producer being a processing entity for writing data, the consumer being a processing entity for reading data written by the producer, the program making a computer perform the functions of:

retaining block state information to be updated in accordance with progress of writing and reading, the block state information is retained in at least two strings comprising bits, wherein each of the bits is assigned to indicate a state of respective one of the buffer blocks such that bits of a first of the at least two strings indicate a write-completed state of respective buffer blocks and bits of a second of the at least two strings indicate a read-completed state of the respective buffer blocks;

providing a first leading pointer, a second leading pointer, a first following pointer, and a second following pointer, each of which points to one of the blocks and moves in the order of the block sequence under a constraint that the pointers move in the same direction and the first leading pointer, the second leading pointer, the first following pointer, and the second following pointer do not pass each other in such order;

when the producer writes data, determining the block designated by the first leading pointer as a block to be written, and moving the first leading pointer to a next block;

after the block designated by the second leading pointer finishes being written, moving the second leading pointer to a block next to a block that is farthest from the second leading pointer among consecutive write-completed blocks subsequent to the block designated by the second leading pointer, the consecutive write-completed blocks being indicated by bits of the first string, when the consumer reads data, determining the block designated by the first following pointer as a block to be read, and moving the first following pointer to a next block; and after the block designated by the second following pointer finishes being read, moving the second following pointer to a block next to a block that is farthest from the second following pointer among consecutive read-completed blocks subsequent to the block designated by the second following pointer, the consecutive read-completed blocks being indicated by bits of the second string.

11. The recording medium containing a program for managing the buffer according to claim 9, wherein: the processing entities are processors; and the block state information is updated and/or the pointers are moved by processors that write or read, or processors that have written or read.

12. The recording medium containing a program for managing the buffer according to claim 9, wherein: the at least two strings are updated by an atomic operation.

13. The apparatus for managing a buffer according to claim 5, wherein: the processing entities are processors; and the block state information updating part and/or the pointer moving part is/are composed of processors that write or read, or processors that have written or read.

14. The apparatus for managing a buffer according to claim 5, wherein: the block state updating part updates the at least two strings by an atomic operation.

15. The method for managing a buffer according to claim 1 further comprises: writing data to the block determined as a block to be written as a block different from a block which is being written by the another producer accessing the buffer simultaneously along with the producer, and reading data from the block determined as a block to be read as a block different from a block which is being read by another consumer accessing the buffer simultaneously along with the consumer.

16. The apparatus for managing a buffer according to claim 5, wherein: the producer writes data to the block determined as a block to be written as a block different from a block which is being written by another producer accessing the buffer simultaneously along with the producer, and the consumer reads data from the block determined as a block to be read as a block different from a block which is being read by another consumer accessing the buffer simultaneously along with the consumer.

* * * * *